United States Patent Office 3,479,164
Patented Nov. 18, 1969

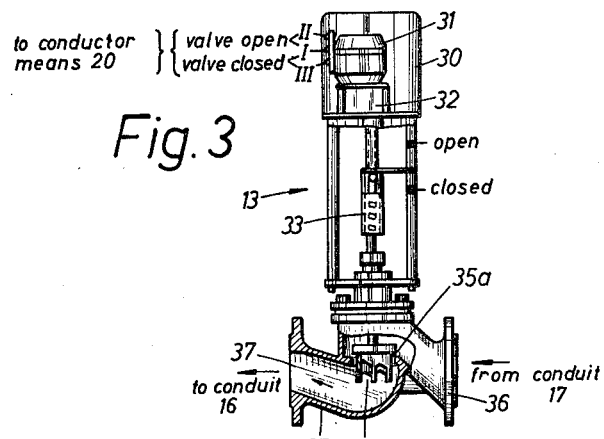
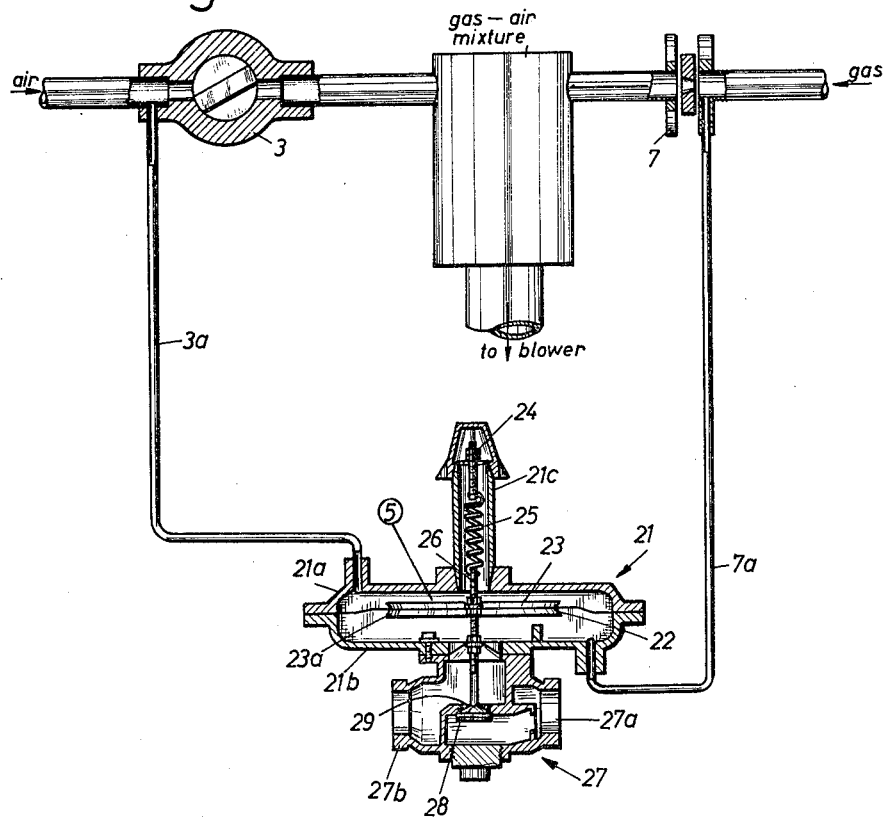

3,479,164
METHOD OF AND ARRANGEMENT FOR CONTROLLING A GAS-AIR MIXTURE
Karl Heinz Edler, Rindern Uber Kleve, Germany, assignor to Ipsen Industries, International Gesellschaft mit beschrankter Haftung, Kleve, Germany
Filed Dec. 28, 1965, Ser. No. 516,843
Claims priority, application Germany, Dec. 29, 1964, J 27,271
Int. Cl. F17b 1/02
U.S. Cl. 48—190     5 Claims

ABSTRACT OF THE DISCLOSURE

A system for gas-air mixture control based upon maintaining a constancy of moisture condition of the final mixture by having air passing thereto varied to maintain the particular moisture condition. A fixed restrictor in the gas conduit means having a diaphragm control valve interposed therewith and a variable restrictor in the air conduit means provides a proportional gas-air supply for endothermic reaction. The reaction product is cooled and tested for moisture condition whereupon adjustment to the air supply is made in response to a predetermined moisture condition.

---

Figure 1:
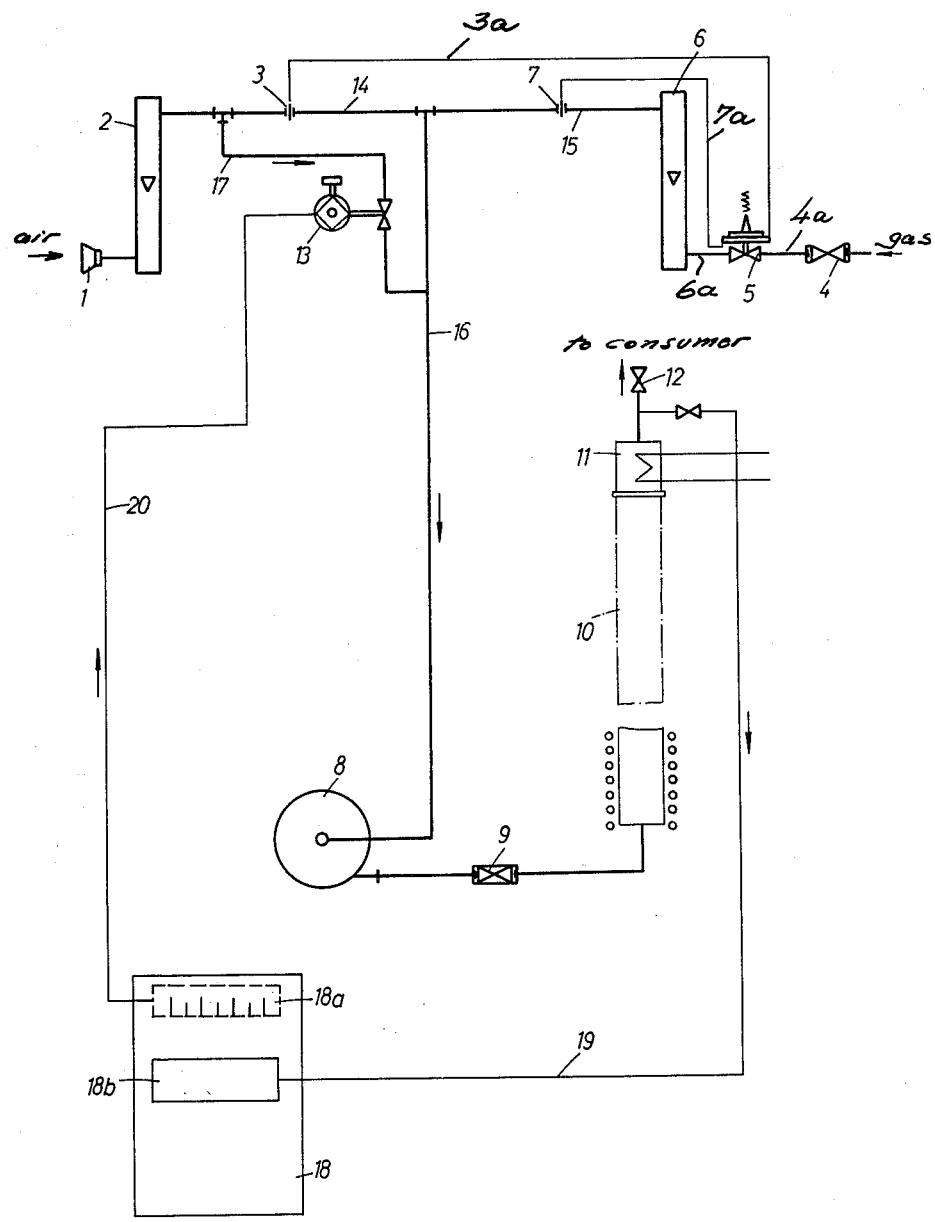

The present invention relates to a method of and device for controlling a gas-air mixture.

It is an object of the present invention to provide a method of and arrangement for controlling a gas-air mixture which will permit maintaining the ratio of gas and air constant regardless of the quantity of the mixture.

It is another object of this invention to provide a method of and arrangement for controlling a gas-air mixture as set forth in the preceding paragraph, which will be simple and reliable.

These and other objects and advantages of the invention will appear more clearly from the following specification in connection with the accompanying drawings, in which:

FIG. 1 diagrammatically illustrates an arrangement according to the present invention.

FIG. 2 diagrammatically illustrates a portion of the circuit of FIG. 1 with a gas control or diaphragm valve.

FIG. 3 is a diagrammatic illustration of a motor valve used in connection with the circuit of the invention as illustrated in FIG. 1.

The arrangement according to the present invention is characterized primarily in that a diaphragm control valve is controlled in conformity with a fixed restrictor arranged in the gas-conveying conduit and in conformity with an adjustable restrictor arranged in the air-conveying conduit. The gas-air mixture controlled in this way is, for instance, in a heated retort transformed into an endothermic protective gas (endothermic designating or pertaining to a reaction which occurs with absorption of heat). The gas-air ratio is controlled in conformity with an analysis value. To this end, a motor valve is arranged in a secondary air conduit interposed between and connected with an air flow meter and the restrictor and leading into the mixture-conveying conduit. The said motor valve is influenced by a thaw, dew or condensation point control which is influenced by the analysis value of a protective gas, while continuously test gas is withdrawn adjacent a cooler for the control mechanism of said thaw, dew or condensation point control.

With such a method, when changing the total quantity of the mixture, the gas-air relationship is held constant by opening or closing a valve, the control device simultaneously bringing about that the mixture will always retain the desired analysis. The thaw, dew or condensation point rated value is adjusted in a thaw, dew or condensation point control. When a thaw, dew or condensation point variation occurs in view of a different composition of the gas, the secondary air conduit is controlled through the motor valve whereby the composition of the mixture is corrected.

Referring more specifically to the drawing illustrating an arrangement for carrying out the method according to the present invention, the air necessary for the mixture is drawn in through an air filter 1 and passes through an air flow mater 2 into the air-conveying primary conduit 14. The gas for the desired gas-air mixture enters the system through valve 4 and conduit 4a and passes through a gas control or diaphragm valve 5 (described further below), a conduit 6a and a gas flow meter 6 to the gas-conveying conduit 15. Interposed in said gas conduit 15 is a fixed restrictor 7, whereas the air-conveying conduit 14 has interposed therein an adjustable restrictor 3. The two restrictors 3 and 7 communicate with the gas control valve 5 through conduits 3a and 7a respectively.

A gas-air mixture conveying conduit 16 leads to a blower 8 and from here passes through a check valve 9 to a heated retort 10 in which the gas-air mixture in an endothermic reaction is converted through the intervention of a nickel catalyst. This mixture then passes through a water cooler 11 where it is quenched to a temperature below the reaction temperature, and is finally conveyed through a control valve 12 to a consumer.

When changing the total quantity of the mixture by opening and closing valve 12, the gas-air relationship will remain constant because the sub-atmospheric pressure at the gas restrictor 7 will reach the same value as the sub-atmospheric pressure at the air restrictor 3.

Connected to the air-conveying conduit 14 between the flow meter 2 and the adjustable restrictor 3 is a secondary air-conveying or air control conduit 17 which through a motor valve 13 (described further below) leads into the mixture-conveying conduit 16. This control device will bring about that the end product, i.e. the endothermic gas, will maintain the desired analysis. To this end, a thaw, dew or condensation point control 18 of any standard design is provided. The rated thaw, dew or condensation point value is adjusted on a scale 18a. The control mechanism 18b is through a conduit 19 in communication with the end gas-conveying conduit so that continuously a test gas is withdrawn through this conduit. The analysis of the gas is determined by means of the thaw, dew or condensation point. When a deviation of the thaw, dew or condensation point is ascertained as caused, for instance, by different composition of the gas, the thaw, dew or condensation point control 18 controls the motor valve 13 through conductor means 20. In this way, based upon operation initiated by moisture-sensitive control means, viz. thaw, dew or condensation point control 18 the mixture is corrected again.

Referring now to FIG. 2 in detail, this figure shows the diaphragm control valve 5 and its connections with the adjustable restrictor 3 and fixed restrictor 7 through conduits 3a and 7a respectively. Valve 5 substantailly comprises a housing 21 composed of an upper section 21a and a lower section 21b. Clamped fast between said housing sections 21a and 21b is the marginal portion of a diaphragm 22 the central portion of which is located between and has connected thereto two plates 23, 23a. Arranged within an upwardly directed tubular extension 21c is an adjusting screw 24 the lower end of which has connected thereto a tension spring 25 the other end of which is connected to a threaded bolt 26 connected in any convenient manner to plates 23, 23a.

Connected to the bottom side of housing section 21b is a control valve 27 with an inlet 27a for connection with conduit 4a. Valve 27 furthermore has an outlet 27b for connection with conduit 6a. The communication between inlet 27a and outlet 27b is controlled by a valve member 28 which in its turn is connected to bolt 26. Adjusting screw 24 is so adjusted that through spring 25 it will hold diaphragm 22 balanced which means that valve member 28 is just in suspended or floating condition. In view of the action of blower 8, sub-atmospheric pressures will occur at the fixed restrictor 7 in conduit 15 and at the adjustable restrictor 3 in conduit 14. These sub-atmospheric pressures are conveyed through conduits 3a and 7a to diaphragm 22 and thereby through tension spring 25 and bolt 26 to valve member 28. Inasmuch as the said sub-atmospheric pressures act in opposite directions upon diaphragm 22, the latter will be adjusted in conformity with a difference in said oppositely directed sub-atmospheric pressures. An adjustment of diaphragm 22 brings about an adjustment of valve member 28, which in turn causes a change in the gas supply from inlet 27a through valve passage 29 to valve outlet 27b, so that the gas pressure at the fixed restrictor 7 will be corrected and the pressure difference will be eliminated or, expressed differently, the desired pressure balance will be re-established. Thus, the gas-air mixture will remain constant.

If it is desired to change the mixing ratio of air and gas, it is merely necessary to change the effective opening of the adjustable restrictor 3 for air. This newly adjusted mixing ratio will then again be maintained by the control system described above.

FIG. 3 shows the motor valve 13 in detail. Valve 13 has a housing 30 with a reversible motor 31 arranged therein which is electrically connected to the control mechanism 18a of thaw, dew or condensation point control 18. The arrangement is such that when current passes through terminals I and II, motor 31 will turn in one direction, e.g. counterclockwise, to convey more secondary air from conduit 17 to conduit 16, whereas when current flows through terminals I and III, motor 31 will turn in the opposite direction, i.e. clockwise direction, to thereby cause a reduction in the flow of secondary air from conduit 17 to conduit 16. When no current passes through motor 31, it will be at a standstill, which means that the flow of secondary air from conduit 17 to conduit 16 remains the same, i.e. constant.

Motor 31 through the intervention of a transmission 32 and transmitting elements 33 is adapted to actuate a valve member 34 which is located in a valve housing 35 and controls valve passage 35a and thereby the communication between valve inlet 36 communicating with conduit 17 and valve outlet 37 communicating with conduit 16. Depending on the rotation of motor 31 in one or the other direction, valve member 34 will move in valve closing or valve opening direction to thereby increase or reduce the flow of secondary air from conduit 17 to conduit 16.

It is, of course, to be understood that the present invention is, by no means, limited to the particular method and arrangement set forth above but also comprises any modifications within the scope of the appended claims. It is further to be understood that the present invention is not limited to any specific gases.

What I claim is:

1. An arrangement for controlling a gas-air mixture, which includes: primary air conduit means having an inlet for receiving air to be intermixed with a gas, gas conduit means for receiving the gas to be intermixed with the air to be drawn in through said primary air conduit means, first restrictor means interposed in said primary air conduit means and being adjustable, second restrictor means interposed in said gas conduit means and being fixed, control valve means interposed in said gas conduit means and communicating on one hand with said first restrictor means and on the other hand with said second restrictor means while being operatively responsive to the flow of air and of gas through said first and second restrictor means respectively, blower means, air-gas mixture conveying conduit means communicating on one hand with both said primary air conduit means and said gas conduit means at a branch point between said first and second restrictor means and on the other hand with said blower means, heatable retort means communicating with said blower means for receiving therefrom a gas-air mixture and transforming the same endothermically, and cooling means communicating with said retort means for receiving therefrom the treated gas-air mixture and cooling the same below reaction temperature for release of the treated air-gas mixture to a consumer and for test of moisture condition to be maintained constant for particular air-gas mixture air flow varying means used to vary air flow into the mixture through said air-gas mixture conveying conduit means connected to said blower means in response to a condensation point control means.

2. An arrangement according to claim 1, where the air flow varying means includes secondary air conduit means branching off said primary air conduit means between the inlet thereof and said first restrictor means and communicating with said air-gas mixture conveying conduit means, said condensation point control means communicating on one hand with said cooling means, additional conduit means establishing communication of said condensation point control means with said secondary air conduit means on the other hand, and motor valve means operatively connected to said secondary air conduit means and said additional conduit means and operable by said condensation point control means in response to a deviation from a desired condensation point to control the flow of air through said secondary conduit means into said gas-air mixture conveying conduit means to thereby correct the gas-air mixture reaching said blower means.

3. An arrangement according to claim 1, in which said control valve means is a diaphragm control valve which maintains necessary gas flow through said gas conduit means.

4. A method of preparing a gas-air mixture in a continuous process, which includes the steps of: passing the air to be intermixed with a gas through a primary air conduit including an adjustable first restrictor while passing the gas to be intermixed with said air through a second conduit including an interposed fixed second restrictor, maintaining a desired ratio between said air and said gas independently of mixed volume thereof by controlling the flow of gas through said second conduit in conformity with the air and gas respectively passing through two respective restrictors, intermixing the air and gas having passed through said two restrictors, converting the thus obtained air-gas mixture with an endothermic reaction, and finally quenching the thus treated air-gas mixture for cooling the same below reaction temperature whereupon moisture condition control is superimposed to maintain accurately a particular moisture condition by varying air passing into the mixture.

5. A method according to claim 4, which includes the step of: diverting at least a portion of the mixture after said quenching to determine the condensation point of the treated mixture in order to vary an air flow supplemental to that passing through the adjustable first restrictor in response to a deviation of the treated mixture from a desired condensation point so as to control the air-gas mixture prior to said endothermic reaction.

References Cited

UNITED STATES PATENTS 2,873,173  2/1959  Neumeyer _____ 23—281
2,802,725  8/1957  Kappel _____ 23—281
3,119,672  1/1964  Peirce.

MORRIS O. WOLK, Primary Examiner

J. D. OLSEN, Assistant Examiner

U.S. Cl. X.R.

23—281; 48—180; 73—29